UNITED STATES PATENT OFFICE.

ALFRED TRABAUD, OF NEW YORK, N. Y.

IMPROVEMENT IN PURIFYING ANIMAL-OILS.

Specification forming part of Letters Patent No. 2,855, dated November 21, 1842.

*To all whom it may concern:*

Be it known that I, ALFRED TRABAUD, of the city of New York, have invented a new and Improved Mode of Purifying Animal-Oils; and I do hereby declare that the following is a full and exact description thereof.

Constant endeavors have been made to find a substitute for sperm-oil, the price of which is very high, in common whale-oil; but the animal matter contained in the latter kind of oil prevents free and easy combustion by collecting in the wick, and thereby preventing its capillary effects from going on when obstructed by the albumen, which coagulates at the focus or lighted part of the wick, and finally crusts or carbonizes it, at the same time forming little mushrooms of soot or lamp-black. The result of this effect is smoke accompanied with a most unwholesome and unpleasant smell, and finally the lamp goes out of itself.

It has been attempted to purify these oils by different processes, in order to render them a fit substitute for sperm-oil; but all attempts to accomplish this end have hitherto proved unsuccessful. The first thing to be done was to ascertain the nature of the substances contained in whale-oils, and then to devise some means for extracting them, in order to separate therefrom the oil in a pure state, this being a compound of hydrogen and carbon in such proportions as to produce a white brilliant light free from smell and smoke.

Whale-oils, like all other animal-oils, are composed of stearine and elaine, and of two principles, the one giving color and the other smell. They contain likewise, both in suspension and in solution, spermaceti, albumen, and gelatine, which have been given out by the blood, muscles, and other animal parts from whence these oils have been extracted by heat.

It is on the peculiar property that salts of peroxide of mercury possess for precipitating the albumen and gelatine from their state of solution that my new mode of purification of animal-oils depends.

Operation: After having allowed the solid particles in suspension to settle down naturally by process of time, decant or draw off the oil, in order to submit it to purification, into a tank or boiler heated only at the bottom, into which has previously been put about a third of its whole capacity of river-water. Heat it to a boiling heat, and then pour into it, at intervals and in small quantities, a weak solution of dentochloride of mercury. The chemical reaction operates and forms a flaky precipitate, owing to the presence of the albumen and gelatine, the quantity of which substances can alone determine the quantity of dentochloride of mercury to be made use of. Cease pouring the solution above mentioned as soon as no further precipitate is formed. Then stop the fire, and the oil, when cool, is drawn off to be filtered through animal-charcoal, which terminates the operation.

Instead of allowing time for the settlement of the oil, it may be subjected to the action of carbonate of potash to separate from it all heterogenous matter, in order to operate more expeditiously previously to submitting it to the purifying process hereinbefore described.

Instead of the salts of mercury, any other reactive substance or reagent acting on albumen and gelatine may be employed.

What I claim as my discovery, and desire to secure by Letters Patent, is—

The mode herein set forth of purifying animal-oils by means of the bichloride of mercury.

A. TRABAUD.

In presence of—
WM. EMERSON,
O. W. PARISEN.